United States Patent
Taylor

[11] Patent Number: 6,015,258
[45] Date of Patent: Jan. 18, 2000

[54] WIND TURBINE

[76] Inventor: Ronald J. Taylor, 1169 Long Valley Dr., Cheyenne, Wyo. 82001

[21] Appl. No.: 09/061,508

[22] Filed: Apr. 17, 1998

[51] Int. Cl.[7] .................................. F03D 3/04; F03D 7/00
[52] U.S. Cl. ......................... 415/4.4; 415/2.1; 415/4.2; 415/121.2; 415/208.3; 415/211.1; 415/907; 416/132 R; 416/196 A; 416/244 D; 416/DIG. 6
[58] Field of Search .............................. 415/2.1, 4.2, 4.4, 415/121.2, 186, 208.3, 208.5, 211.1, 907; 416/132 R, 132 B, 196 A, 194, 195, 235, 237, 238, 244 R, 244 D, DIG. 6

[56] References Cited

U.S. PATENT DOCUMENTS

| | | | |
|---|---|---|---|
| 3,938,907 | 2/1976 | Magoveny et al. | 415/141 |
| 4,236,866 | 12/1980 | Zapata Martinez | 415/2 R |
| 4,365,929 | 12/1982 | Retz | 415/2 R |
| 4,575,311 | 3/1986 | Wood | 416/170 R |
| 5,133,637 | 7/1992 | Wadsworth | 415/4.4 |
| 5,380,149 | 1/1995 | Valsamidis | 415/2.1 |
| 5,391,926 | 2/1995 | Staley et al. | |
| 5,463,257 | 10/1995 | Yea | 290/55 |
| 5,553,996 | 9/1996 | Farrar | 415/2.1 |

*Primary Examiner*—Edward K. Look
*Assistant Examiner*—Matthew T. Shanley
*Attorney, Agent, or Firm*—Dean P. Edmundson

[57] ABSTRACT

Wind turbine apparatus is described for converting wind energy into electrical energy. The apparatus includes a rotatable central shaft, a plurality of rotor blades attached to the central shaft, and a plurality of convex airfoils spaced around the periphery of the rotor blades. The ratio of the number of rotor blades to the number of airfoils is at least 1.25 to 1. The size of the apparatus may vary, and the apparatus is useful in a variety of applications and environments. It is very efficient in converting wind energy to electrical energy. It may be operated even in very high wind conditions.

16 Claims, 8 Drawing Sheets

WIND TURBINE

FIELD OF THE INVENTION

This invention relates to wind-driven turbines which are capable of generating electrical energy. More particularly, this invention relates to wind turbines of the type having a rotor and a plurality of stationary stators positioned around the rotor.

BACKGROUND OF THE INVENTION

Windmills and wind turbine machines of various designs have been previously proposed for use in converting wind energy to electrical energy. Machines of the type utilizing a plurality of exposed blades rotating about a horizontal axis are in commercial use in a number of different locations. However, such machines cannot be safely operated in high wind conditions because they lack sufficient structural integrity. Furthermore, such machines are deadly to any birds which may fly into the path of the rotating blades.

Previously disclosed wind turbines typically utilize a rotor which is rotatable about a vertical axis. The rotor normally includes a plurality of blades. A plurality of stationary wind deflectors or wind-directing blades are positioned around the rotor to deflect air toward the rotor blades. The typical wind deflectors are generally planar or slightly curved devices which are vertically oriented and are positioned around the perimeter of the rotor.

A variation of the typical wind turbine apparatus previously known is described in U.S. Pat. No. 5,391,926. That apparatus requires the use of passive stationary blades which have corresponding and opposing double curves. The apparatus as shown in the patent also utilizes twice as many stationary blades as rotor blades. The opposing double curves of the stationary blades leads to undesirable air turbulence, thereby inherently limiting the efficiency of the apparatus.

There has not heretofore been provided a wind turbine apparatus having the features and advantages provided by the present invention.

SUMMARY OF THE PRESENT INVENTION

In accordance with the present invention there is provided wind turbine apparatus which is very efficient in converting wind energy to electrical energy. In a preferred embodiment the apparatus comprises:

(a) a rotatable central shaft member;

(b) a plurality of rotor blades each having inner and outer edges; wherein the inner edges are attached to the shaft member;

(c) a plurality of airfoils spaced around the periphery of the rotor blades; wherein each airfoil has a convex cross-section and a cross-sectional length-to-width ratio in the range of about 8–12:1;

and wherein the ratio of the number of rotor blades to the number of airfoils is at least 1.25 to 1.

The unique shape and arrangement of the airfoils relative to the rotor blades provides for smooth and efficient movement of air past the airfoils and against the surface of the rotor blades with minimal turbulence. The apparatus is omni-directional so that the wind energy is imparted to the rotor regardless of the direction of the wind. The apparatus is fully functional even in very high wind conditions. It is very efficient in converting wind energy to electrical energy.

Preferably the orientation of each airfoil relative to the rotor blades is such that the angle of attack of the air coming off the airfoil and hitting a rotor blade is in the range from about 20 to 90 degrees as the central shaft rotates.

The present invention also provides a pyramid base for supporting the wind turbine apparatus and for enclosing the electrical generator, control system, batteries, etc. The base has sloping walls to direct wind currents upwardly toward the rotor. This results in additional efficiency of the apparatus.

In another aspect, the present invention provides uniquely shaped rotor blades in which the outer edge of each blade includes a portion bending away from the direction of rotation of the rotor. This feature enhances the ability of the rotor blades to better hold the wind and transfer the wind energy to rotational energy.

In yet another aspect of the invention, a number of horizontal gussets may be used to reinforce the rotor and improve its structural rigidity (particularly in high wind speed conditions).

The size of the wind turbine apparatus may vary, for example, from about 1.5 to 48 feet in diameter and from about 1.5 to 24 feet in height.

It is also possible to stack one wind turbine apparatus of the invention on top of another in order to obtain increased energy conversion. In such case, the central shafts of the two stacked units are coupled together.

To prevent injury to birds or persons, the perimeter of the apparatus can be covered with wire mesh. This does not interfere with operation or efficiency of the apparatus. The mesh also reduces opportunity for vandalism of the apparatus.

The apparatus is highly efficient in converting wind energy into electrical energy by means of a generator which is housed in the base of the apparatus. As much as 92–94% of the energy of the wind which passes through the rotor is converted to rotational torque applied to the electrical generator. The electrical energy produced may be fed to an existing electrical grid, or to batteries for storage, or directly into a dedicated or closed electrical system.

Other features of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

In the accompanying drawings there is shown one embodiment of wind turbine apparatus 10 of the invention which comprises a rotatable rotor 12 and a plurality of stationary or fixed airfoils 14 which are positioned around the perimeter of the rotor 12. Preferably a top plate 10B is secured to the upper ends of the airfoils, and a bottom plate 10A is secured to the lower ends of the airfoils to improve structural strength and to force wind currents which enter the apparatus to push against the rotor blades.

Figure 2:
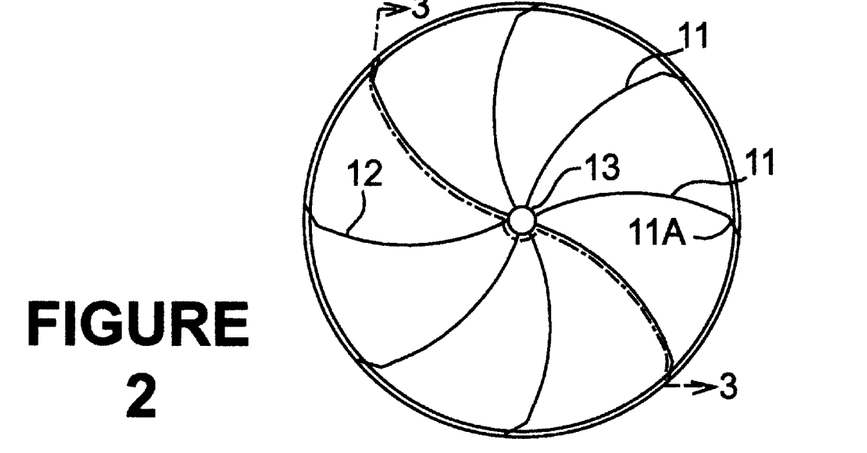
FIG. 2 is a top view of one embodiment of a rotor which is useful in the apparatus of this invention.

The rotor includes a plurality of blades 11 which radiate outwardly from a central shaft 13. The rotor blades are preferably all of the same size and style and are equidistantly spaced around the central shaft. The preferred shape of the blades is as shown in FIG. 2. The portion 11A along the outer edge of each blade is angled away from the direction of rotation of the rotor (e.g. about 15 to 80 degrees). The blades are concave on the side which is acted upon by the wind currents. The angled outer edge 11A helps to hold the moving air current on the blade longer so that more wind energy is captured by the blade.

Figure 2A:
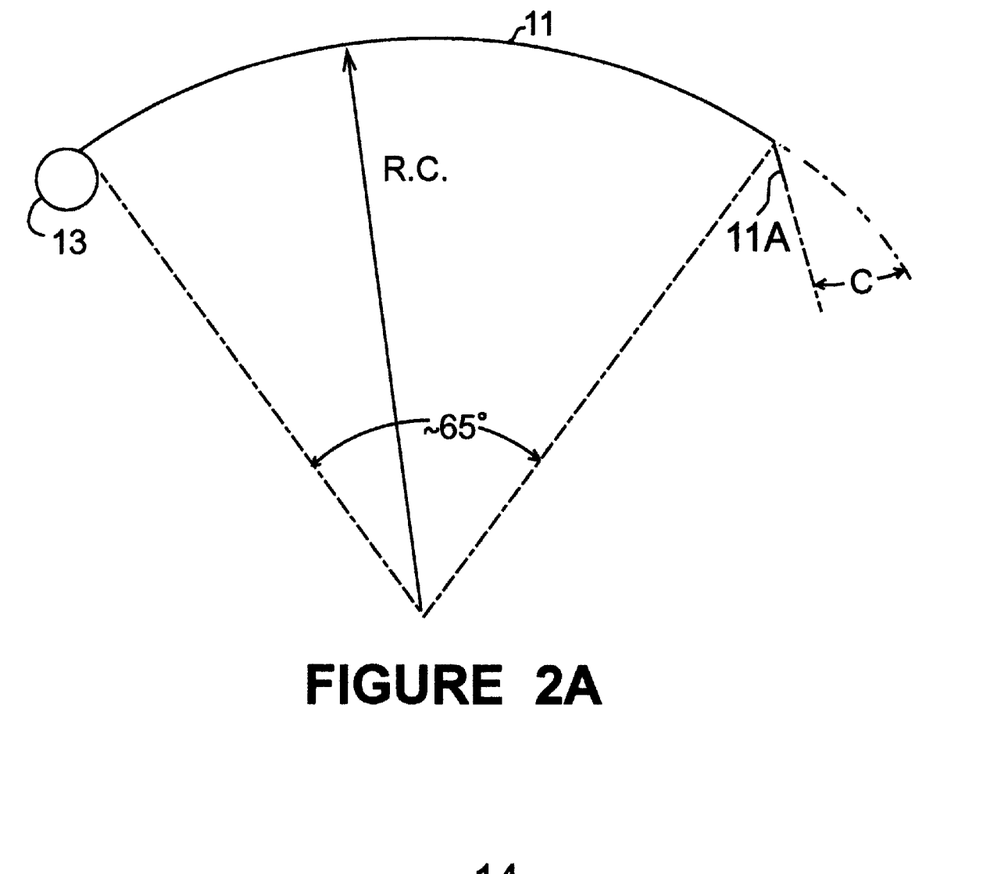
FIG. 2A is a top view illustrating one of the blades on a preferred rotor for use in this invention.
Figure 3:
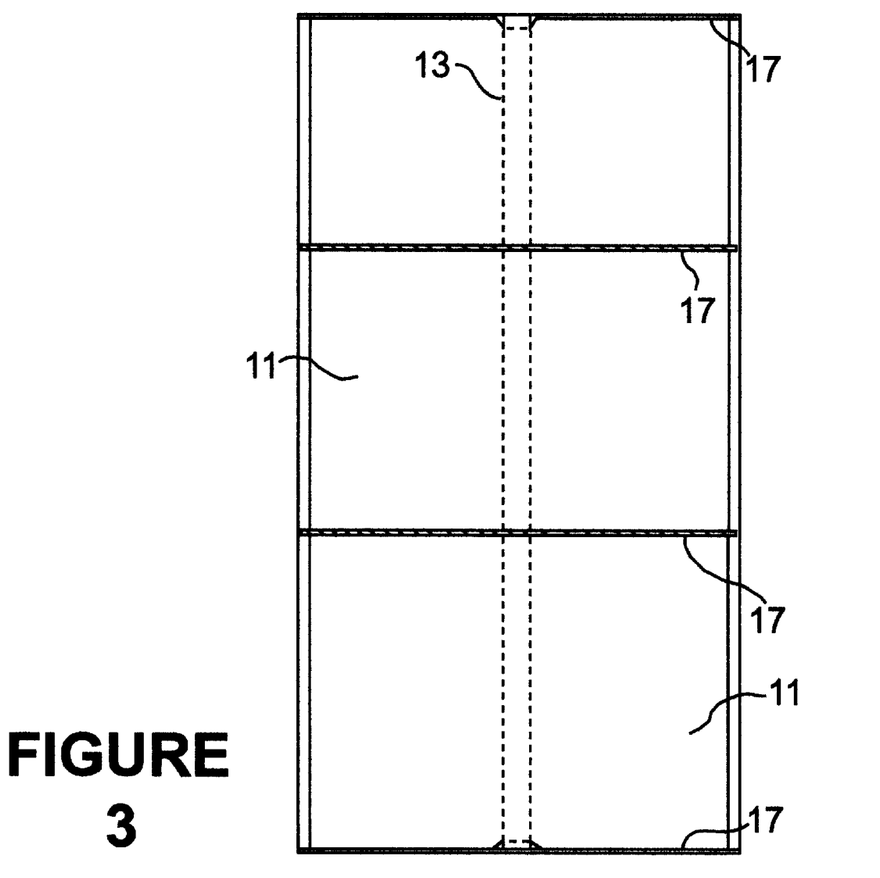
FIG. 3 is a sectional view of the rotor shown in FIG. 2 taken along line 3—3.

The preferred cross-sectional shape of each rotor blade is shown in FIG. 2A. The radius of curvature, R.C., of the blade is such that air is held on the surface of the blade long enough to obtain maximum thrust. Too little curvature (i.e., a flatter blade) does not hold the air on the blade long enough. Too much curvature has a tendency to block a portion of the airflow from the surface and thus lower the efficiency of the turbine. Preferably the curvature of each rotor blade is such that an angle of about 65 degrees is defined as illustrated in FIG. 2A.

Preferably the outer edge 11A of each rotor blade is bent or angled away from the direction of rotation of the rotor central shaft. Preferably the angle C defined by the outer edge portion 11A is about 30 degrees. The width of edge portion 11A is in the range of about 2 to 6 inches. If the width of portion 11A is too great, turbulence on the blade is increased and efficiency suffers. If the width is too small, the desired retention effect of holding the air flow on the blade is reduced and efficiency is reduced.

Figure 4:
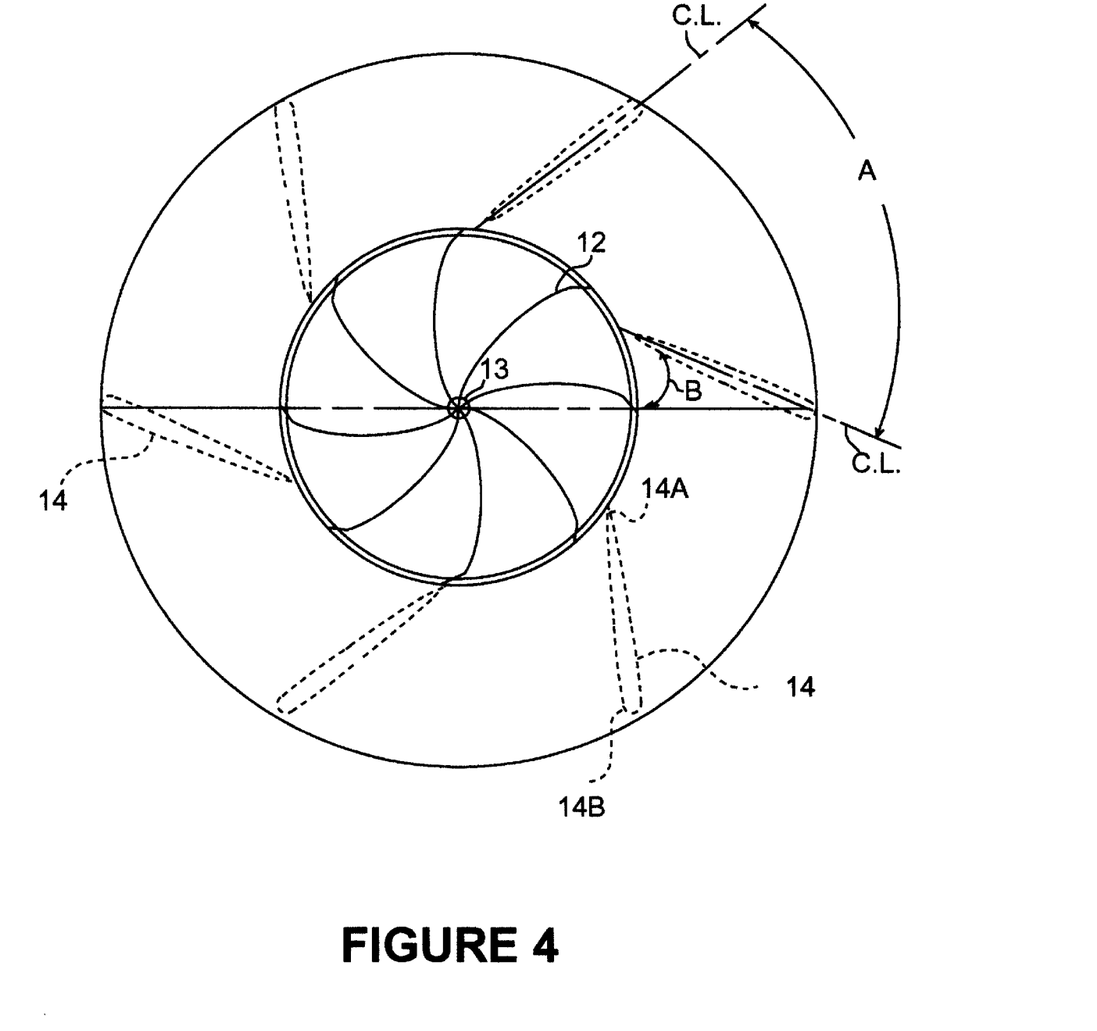
FIG. 4 is a top view of one embodiment of a wind turbine apparatus of the invention.
Figure 4A:
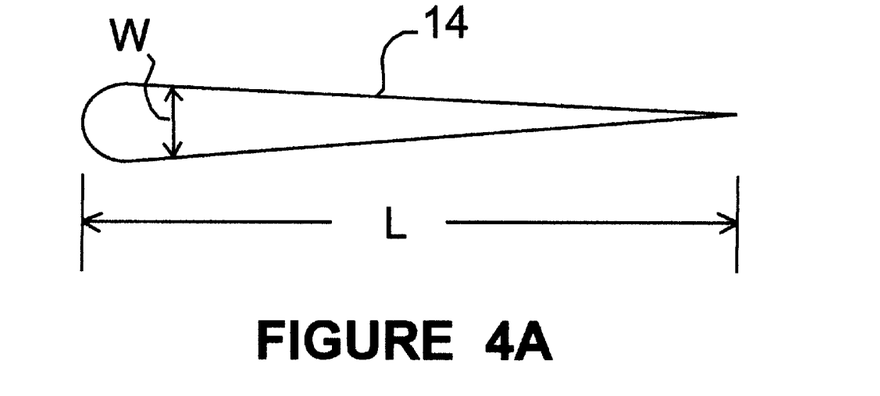
FIG. 4A is a cross-sectional view of a preferred airfoil design.

The preferred shape and arrangement of the airfoils is as shown in FIGS. 4 and 4A. The airfoils are double convex in cross-section and have a tapered inner edge 14A. The outer edge 14B is rounded. Preferably the opposite sides of each airfoil are symmetrically shaped relative to the centerline of the airfoil. This shape provides for much smoother and efficient air flow than is possible with flat, single-curved or double-curved directional blades or stator blades previously proposed by others in this field. The preferred cross-sectional shape of the airfoil is as shown in FIG. 4A. Testing pursuant to this invention has shown that there is a direct relationship between the length and the thickness or width of the airfoil to the overall turbine performance. A preferred ratio of L to W is in the range of about 8–12:1 to maintain maximum efficiency of airflow with a minimum of negative turbulence and trailing edge separation. A lower ratio of L:W produces a more adverse gradient (higher degree of trailing edge separation and increased adverse turbulence).

Each airfoil is preferably positioned such that the angle B between the airfoil and an adjacent rotor blade is in the range of about 10 to 45 degrees (with 20–30 degrees being preferred), as shown in FIG. 4. The design and arrangement of the airfoils prevent wind currents from impacting the backside of the rotor blades (which would have a tendency to slow the rotor and reduce efficiency). Also, the arrangement of airfoils directs airflow onto each rotor blade from the center of the blade outward in order to maximize the power of the wind. The angle A defined between adjacent airfoils is 60 degrees when six airfoils are used.

The number of rotor blades relative to the number of airfoils is very important. It has been found that the ratio of the number of rotor blades to the number of airfoils must be at least 1.25 to 1 (and may be as great as 2:1). When the ratio is less than that just stated, the efficiency of conversion of wind energy to electrical energy is reduced significantly. Preferably there are at least seven rotor blades and at least five airfoils utilized in the apparatus. More preferably there are 8 to 12 rotor blades and 6 to 8 airfoils.

When the number of rotor blades is equal to or less than the number of airfoils, a rotor blade has a tendency to hesitate or hide behind the airfoil at low wind speeds and the apparatus will not operate as efficiently as when the number of rotor blades exceeds the number of airfoils. Rotor rpm was increased 20 to 25% by using 8 rotor blades and 6 airfoils. When the number of rotor blades exceeds a ratio of 2:1, there is resistance to new air inflow at higher wind velocities, thus reducing power applied to the rotor.

Figure 8:
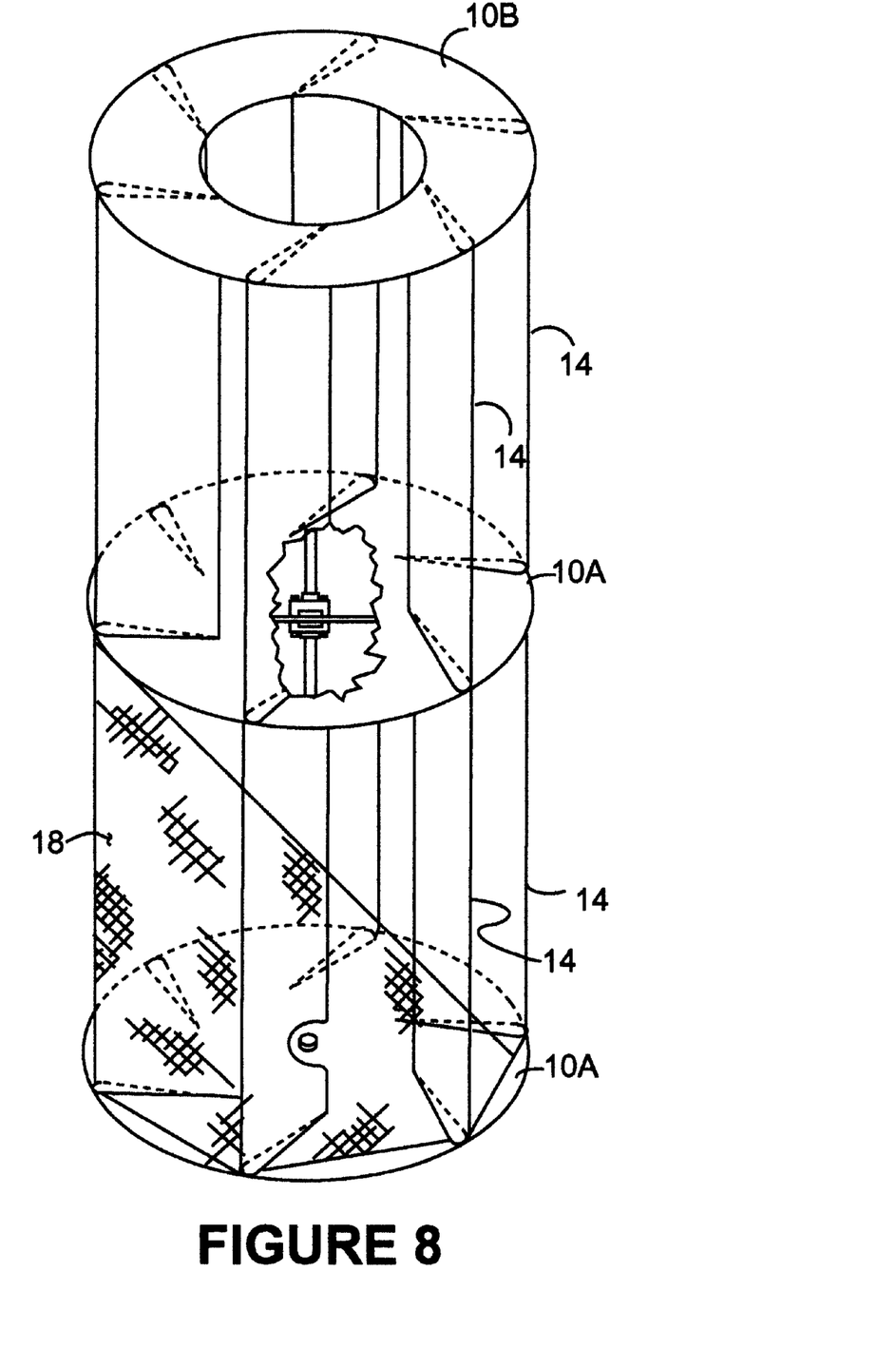
FIG. 8 is a perspective view illustrating another embodiment of wind turbine apparatus of this invention.

The wind turbine apparatus of the invention can be made in any desired size. The apparatus may have a diameter from about 1.5 feet to 48 feet or even greater, if desired. The height may also vary, for example, from about 1 foot to 30 feet, or more if desired. It is also possible to stack one such apparatus on top of another (e.g. as shown in FIG. 8 where the central shafts of the two units are connected together). It is also possible to offset the airfoils on the upper unit from the airfoils of the lower unit to obtain more uniform application of torque from the two rotors to the central shaft.

Another feature of this invention is the provision of wire mesh 18 or screen around the entire periphery of the airfoil assembly. This is also illustrated in FIG. 8. The mesh prevents birds and persons from intentionally or inadvertently entering into the apparatus where they could be injured by the rotating rotor or where the rotors themselves could become damaged. The mesh also prevents trash and debris from entering into the apparatus.

Figure 1:
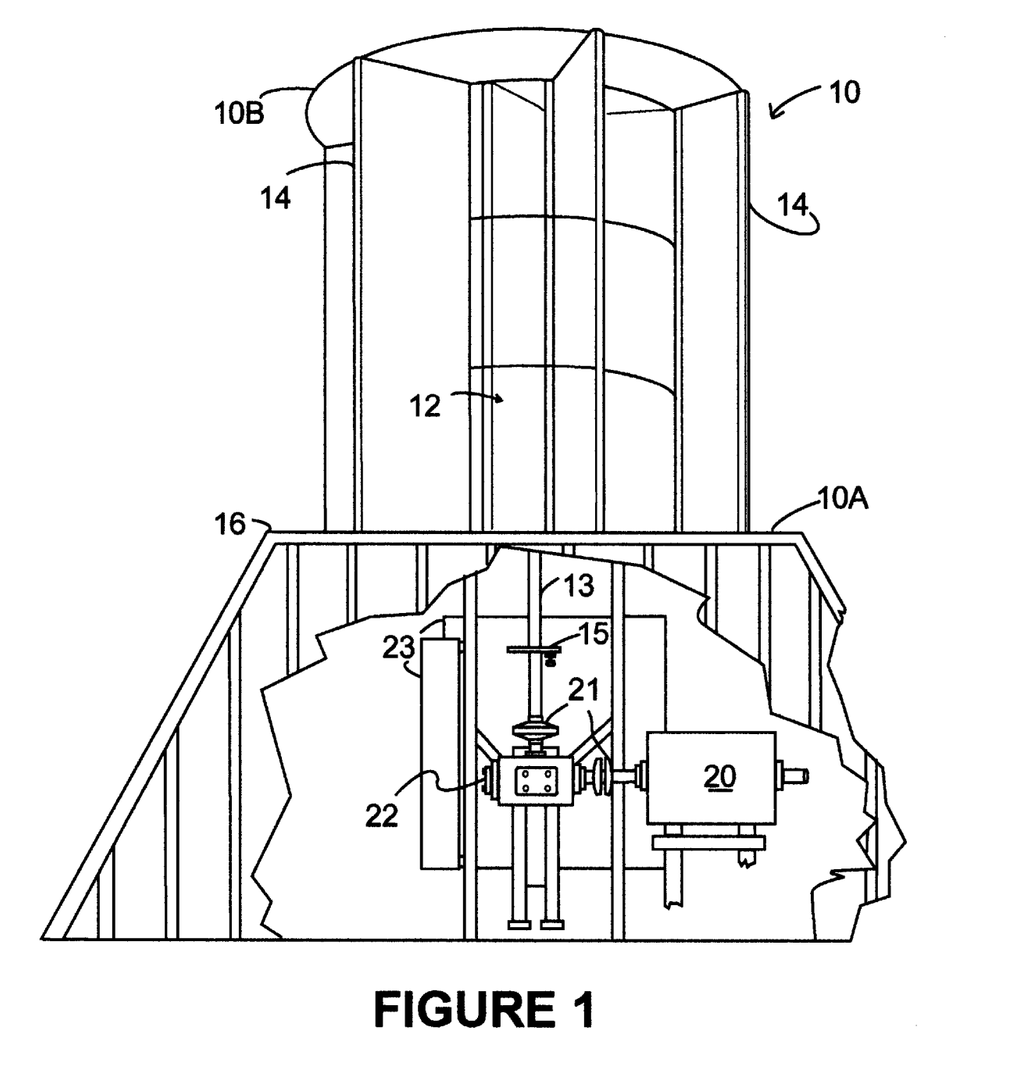
FIG. 1 is a front elevational, partially cut-away, elevational view of one embodiment of wind turbine apparatus of the invention.

A preferred form of the wind turbine apparatus for generating electrical energy from wind energy is shown in FIG. 1. The central shaft 13 of the rotor extends through the base 10A and into the housing or enclosure 16 on which the apparatus is supported. The enclosure 16 has four side walls which are angled or sloped inwardly from a floor up to the horizontal roof. The sloped walls facilitate movement of wind currents upwardly toward the rotor. The angle of each side wall relative to the floor is in the range of about 20 to 80 degrees (with 45 to 60 degrees being preferred), depending upon installation location and conditions.

The lower end of the central shaft is connected to a gear box 22 via a flexible omega coupler. A disk brake 15 is preferably included for the purpose of enabling the central shaft to be slowed and locked in a stationary position whenever repairs or servicing of the apparatus is desired.

Figure 6:
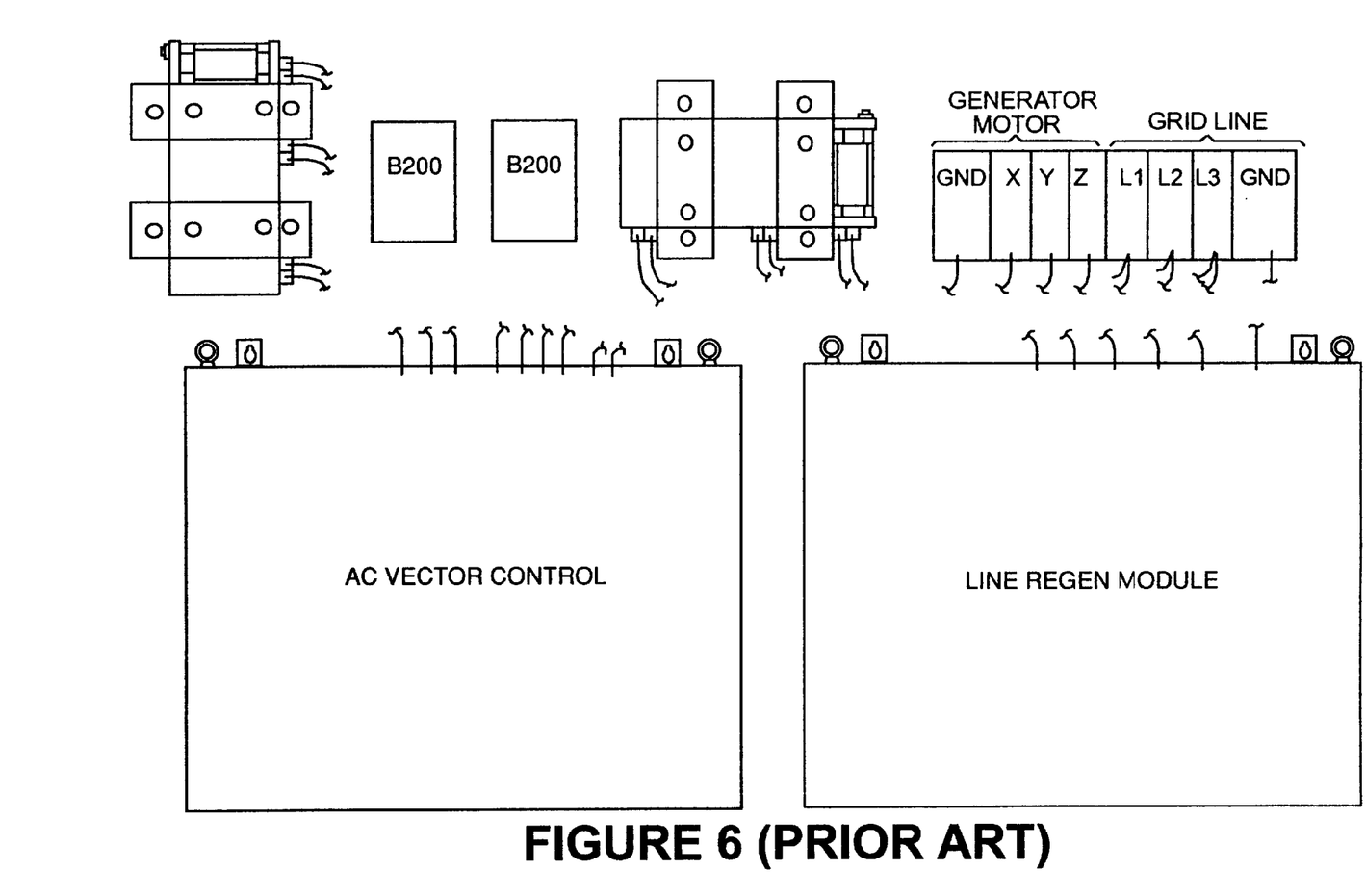
FIG. 6 is an elevational view of a control system useful in this invention.
Figure 7:
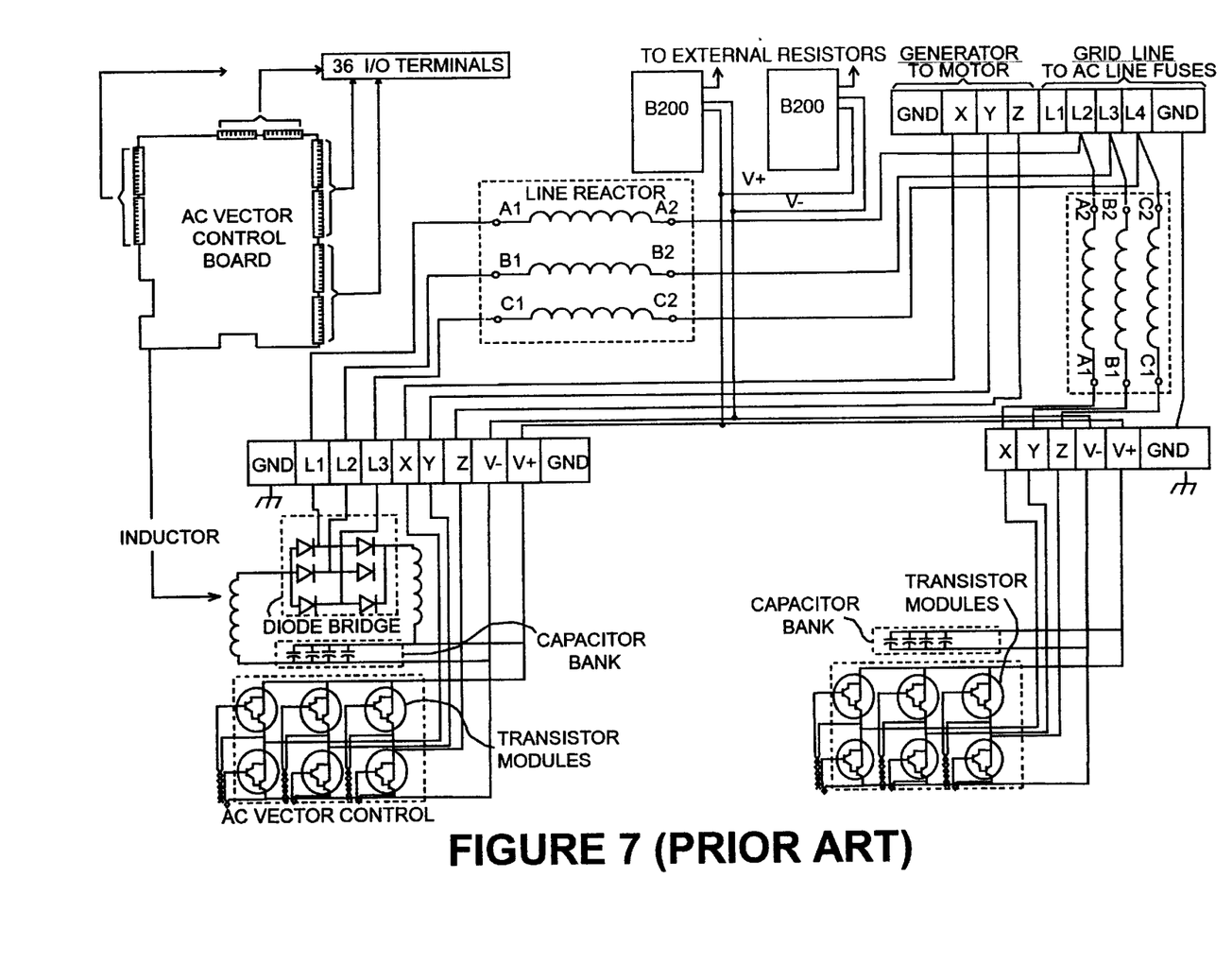
FIG. 7 is a wiring diagram which is useful in controlling the electrical energy output from a wind turbine apparatus of the invention.

The output shaft from the gear box is coupled to an electrical generator 20 with a flexible coupler. Control units 23 control the interconnection of the turbine to the utility grid, for example, or to a battery system for storage of electrical energy. The control system also provides system performance measurements for operator evaluation, and it also provides for safe shutdown under normal and default conditions. The inputs to the control system are: shaft rpm, generator speed, generator current, generator temperature, vibration, line voltage, wind speed, line harmonics, all fault conditions, over voltage, and utility line surges. The control systems shown in FIGS. 6 and 7 are commercially available and are described in U.S. Pat. Nos. 5,079,494 and 5,256,949, incorporated herein by reference.

The wind turbine apparatus of this invention is useful in a variety of industries and applications, such as transmitter sites, buildings (e.g. office buildings, or recreational cabins, or homes), remote villages, oil platforms, ranches and farms, aircraft (e.g. to provide emergency power for hydraulic systems and control surfaces), recreational vehicles, commercial trucking, shipping, yachts, etc.

The apparatus of this invention is fully functional for generating electrical energy even in very high wind conditions. Yet, the apparatus is capable of generating electrical energy even at low wind speeds (e.g. 8 miles per hour).

The apparatus is normally provided as a vertical-axis unit, although it is also possible for the apparatus to be used as a horizontal-axis unit, if desired. For example, in subterranean or water (hydro) applications it may be preferred to use a horizontal-axis unit.

Figure 5:
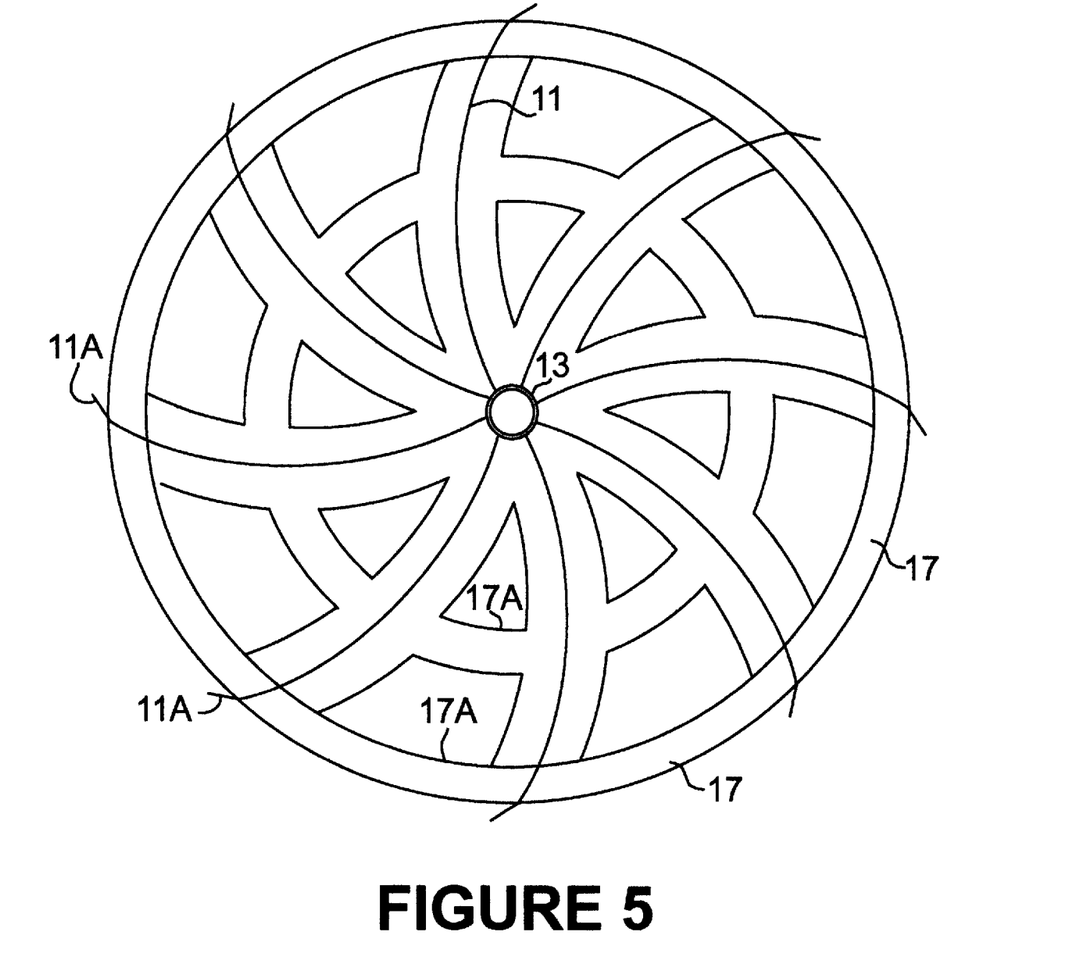
FIG. 5 is a top view of another embodiment of rotor which is useful in this invention.

As another variation of the invention, the rotor may be reinforced with a number of gussets 17 which extend horizontally between adjacent rotor blades. Preferred gussets include openings 17A as shown in FIG. 5. The gussets also provide lift to the rotor as wind currents are directed upwardly to the rotor by the sloped walls of the enclosure shown in FIG. 1. The gussets are vertically spaced from each other about 3 to 4 feet apart.

The gussets as shown herein have been proven to be extremely significant in maintaining structural integrity of the rotor at high wind velocities. Rotors which do not include the gussets may not be structurally adequate for use in winds of 60 to 90 miles per hour.

Other variants are possible without departing from the scope and spirit of this invention.

What is claimed is:

1. Wind turbine apparatus comprising:
    (a) a rotatable central shaft member;
    (b) a plurality of rotor blades each having inner and outer edges and upper and lower ends; wherein said inner edges are attached to said shaft member; and wherein each said outer edge is angled away from the direction of rotation of said central shaft member;
    (c) a plurality of airfoils spaced around the periphery of said rotor blades, wherein each said airfoil has a convex cross-section and a cross-sectional length-to-width ratio in the range of about 8–12:1; and
    (d) gussets extending between adjacent rotor blades in horizontal planes and positioned between said upper and lower ends; wherein said gussets include openings;
and wherein the ratio of the number of rotor blades to the number of said airfoils is at least 1.25 to 1.

2. Apparatus in accordance with claim 1, wherein each said airfoil comprises an inner edge and an outer edge; wherein said inner edge is tapered; and wherein said outer edge is rounded.

3. Apparatus in accordance with claim 1, wherein the diameter of said rotor is in the range of about 12 inches to 24 feet.

4. Apparatus in accordance with claim 1, wherein the distance between said inner edge and said outer edge of said airfoil is in the range of about one to twelve feet.

5. Apparatus in accordance with claim 1, wherein the height of said rotor blades and said airfoils is in the range of about 1 to 24 feet.

6. Apparatus in accordance with claim 2, wherein each said airfoil is symmetrically curved relative to a centerline extending between its said inner and outer edges.

7. Apparatus in accordance with claim 1, wherein the angle defined between said airfoils and said rotor blades is in the range of about 20 to 90 degrees upon rotation of said central shaft.

8. Apparatus in accordance with claim 1, wherein there are 8 to 12 rotor blades and 6 to 8 airfoils.

9. Apparatus in accordance with claim 1, further comprising top and bottom plates secured to said airfoils.

10. Apparatus in accordance with claim 1, further comprising mesh extending around said airfoils.

11. Apparatus in accordance with claim 1, further comprising base means supporting said apparatus, wherein said base means comprises four side walls sloping upwardly towards each other.

12. Apparatus in accordance with claim 11, wherein each said wall forms an angle in the range of about 45 to 60 degrees relative to horizontal.

13. Wind turbine apparatus comprising:
    (a) a first wind turbine comprising:
        (i) a first rotatable rotor having a first central shaft;
        (ii) a plurality of first airfoils positioned around the perimeter of said first rotor;
        (iii) a base plate supporting said first airfoils;
        (iv) a top plate supported by said first airfoils;
    (b) a second wind turbine comprising:
        (i) a second rotatable rotor having a second central shaft coaxial with and connected to said first central shaft;
        (ii) a plurality of second airfoils positioned around the perimter of said second rotor and supported by said top plate; and
    (c) base means supporting said first wind turbine, wherein said base means comprises side walls sloping upwardly towards each other; and
    (d) a generator housed within said base means and being operatively connected to said first central shaft and being capable of generating electrical energy in response to rotation of said first central shaft.

14. Wind turbine apparatus comprising:
    (a) a rotatable central shaft member;
    (b) a plurality of rotor blades each having inner and outer edges; wherein said inner edges are attached to said shaft member;
    (c) a plurality of airfoils spaced around the periphery of said rotor blades, wherein each said airfoil has a convex cross-section and a cross-sectional length-to-width ratio in the range of about 8–12:1; and
    (d) base means supporting said apparatus, wherein said base means comprises side walls sloping upwardly towards each other;
and wherein the ratio of the number rotor blades to the number of said airfoils is at least 1.25 to 1.

15. Apparatus in accordance with claim 14, wherein there are four side walls and each said wall forms an angle in the range of about 45 to 60 degrees relative to horizontal.

16. Wind turbine apparatus comprising:
    (a) a rotatable central shaft member;
    (b) a plurality of rotor blades each having inner and outer edges; wherein said inner edges are attached to said shaft member;
    (c) a plurality of airfoils spaced around the periphery of said rotor blades, wherein each said airfoil has a convex cross-section and a cross-sectional length-to-width ratio in the range of about 8–12:1;
    (d) gussets extending between adjacent rotor blades in horizontal planes, wherein said gussets include openings;
and wherein the ratio of the number of rotor blades to the number of said airfoils is at least 1.25 to 1.

* * * * *